US005493285A

United States Patent [19]

Yoshizawa

[11] Patent Number: 5,493,285

[45] Date of Patent: Feb. 20, 1996

[54] PAGING RECEIVER SUITABLE FOR AN EMERGENCY CALL

[75] Inventor: Shigeo Yoshizawa, Tokyo, Japan

[73] Assignee: NEC Corporation, Japan

[21] Appl. No.: 188,147

[22] Filed: Jan. 27, 1994

[30] Foreign Application Priority Data

Jan. 28, 1993 [JP] Japan .................................... 5-012621

[51] Int. Cl.[6] ...................................................... H04Q 7/00

[52] U.S. Cl. .................................. 340/825.44; 340/311.1; 379/57

[58] Field of Search ............................ 340/825.44, 311.1; 379/57

[56] References Cited

U.S. PATENT DOCUMENTS

| | | | |
|---|---|---|---|
| 4,438,433 | 3/1984 | Smoot et al. | 340/825.44 |
| 4,701,759 | 10/1987 | Nadir et al. | 340/825.44 |
| 4,713,808 | 12/1987 | Gaskill et al. | 340/825.44 |
| 4,786,901 | 11/1988 | Matai et al. | 340/825.47 |
| 4,835,777 | 5/1989 | De Luca et al. | 340/825.44 |
| 4,839,639 | 6/1989 | Sato et al. | 340/825.44 |
| 4,872,005 | 10/1989 | DeLuca et al. | 340/825.44 |
| 4,949,085 | 8/1990 | Fisch et al. | 340/825.44 |
| 5,012,219 | 4/1991 | Henry | 340/825.44 |
| 5,347,269 | 9/1994 | Vanden Heuvel et al. | 340/825.44 |
| 5,384,565 | 1/1995 | Cannon | 340/825.44 |

FOREIGN PATENT DOCUMENTS 497578 1/1992 European Pat. Off. .......... G08B 3/10

OTHER PUBLICATIONS

"Instruction Manual of R4A4–7B", Chapters 3 and 4, pp. 3–1 to 3–7 and 4–1 to 4–7.

*Primary Examiner*—Donald J. Yusko
*Assistant Examiner*—Edward Merz
*Attorney, Agent, or Firm*—Ostrolenk, Faber, Gerb & Soffen

[57] ABSTRACT

A paging receiver of the present invention includes a decoder for processing a paging number and a message signal of a transmitted radio signal and receives the radio signal selectively by comparing the paging number with a predetermined paging number of the receiver. A timer stamps the message signal with current time when the paging number coincides with the predetermined paging number of the receiver. A memory stores message signals already received and stamped with time information. The message signal stamped with current time is compared with the message signals stamped with received time stored in the memory and, when contents of these message signals are coincident and a difference in time between these message signals is within a predetermined time, the message signal is deemed as an urgent message and an urgent report is performed.

8 Claims, 6 Drawing Sheets

PAGING RECEIVER SUITABLE FOR AN EMERGENCY CALL

BACKGROUND OF THE INVENTION

The present invention relates to a paging receiver and, particularly, to a paging receiver suitable for an emergency call.

The paging receiver has several kinds of functions, one of which is to change calling formats by the bearer himself according to the bearer's environmental noise or situation. However, the receiver encounters the problem that when the bearer sets calling forms such that a ringing sound volume, for example, is small, he may not be aware of a calling even if it is an emergency call.

To deal with the problem, a conventional paging receiver uses a second call number for an emergency call, which is different from a normal call number. When the paging receiver receives the second call number, it sets calling format such that a bearer can be easily aware of the emergency call immediately by generating, for example, a louder ringing sound regardless of the calling format set in the receiver. Such paging is known as "dual call service" and an example of such paging is disclosed in U.S. Pat. No. 4,438,433.

In such a conventional paging receiver, however, the second call number must be kept, leading to an increase of call numbers. Further, it is necessary to selectively use either of two call numbers, the usual call number and the emergency call number, properly in a calling side. This is troublesome.

An object of the present invention is to provide a paging receiver which, when an identical message signal is received twice within a predetermined period of time, deemes it an emergency call.

SUMMARY OF THE INVENTION

A paging receiver according to the present invention comprises a processing circuit for processing a paging number inherent to the paging receiver and message information subsequent to the paging number, which are contained in a transmitted radio signal. An address check circuit compares a paging number stored into an ID code memory with the preset paging number of the paging receiver, and the receiver selectively receives the signal when these paging numbers are coincident. A timer provides a current time. A time adder circuit attaches the current time to message information. A message memory circuit stores received message information with a receiving time. A comparator compares the message information with the current time the message information with a receiving time stored in the message memory and determines whether or not the message information with the current time is received again within a predetermined period of time. An emergency call circuit notifies an emergency when the comparator determines that the message information with the current time is received again.

The present invention will be described in detail with reference to the BRIEF DESCRIPTION OF THE DRAWINGS and the DETAILED DESCRIPTION OF THE INVENTION.

DESCRIPTION OF THE PREFERRED EMBODIMENTS

Figure 1:
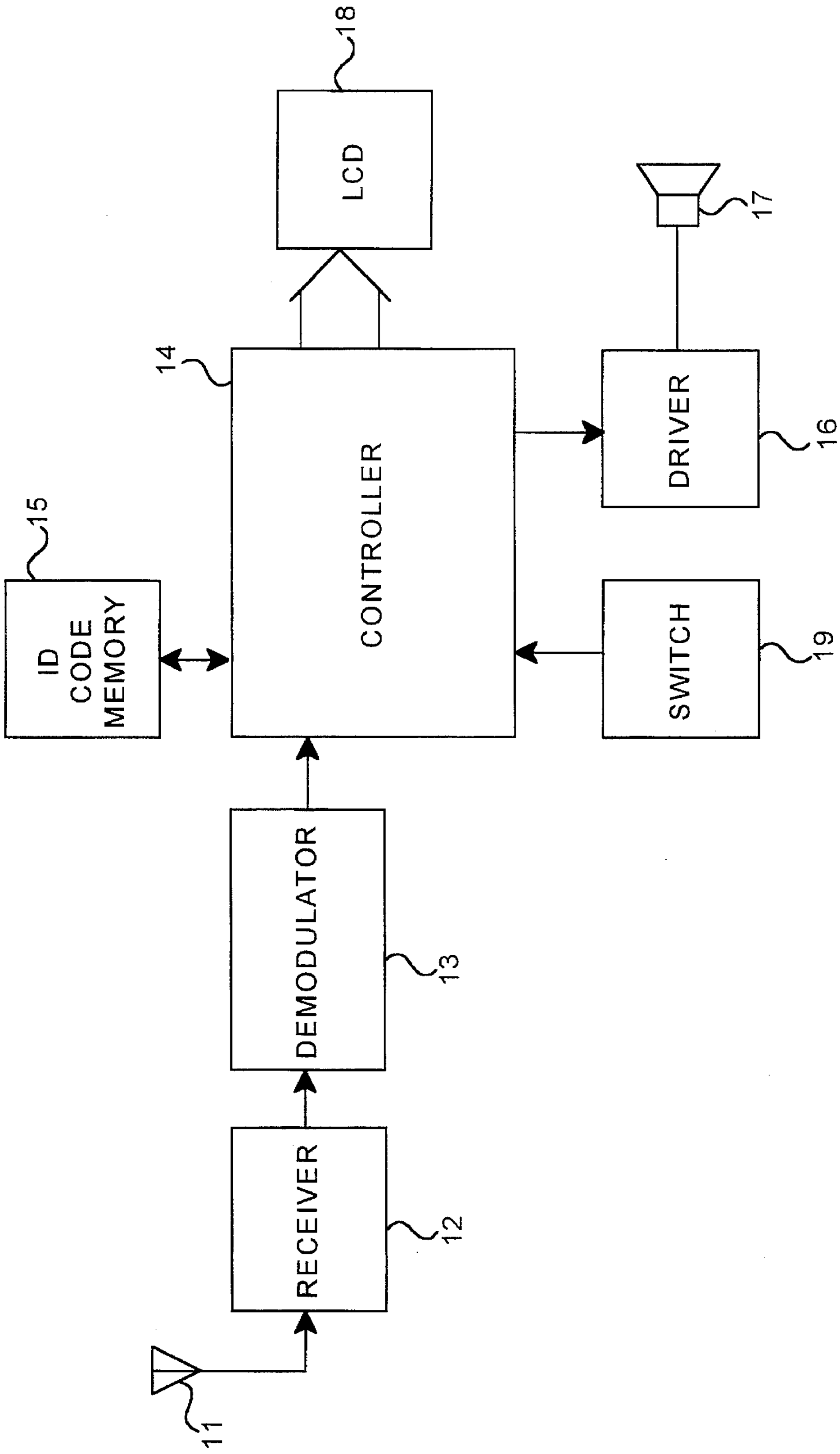
FIG. 1 is a block diagram showing a paging receiver to be used in the present invention.

In FIG. 1, a modulated radio carrier containing a paging number and message information subsequent thereto is received at an antenna 11. The modulated radio carrier received at the antenna 11 is amplified at a receiver section 12, demodulated to a baseband signal and waveform-shaped to a digital signal by a demodulator 13 and sent to a controller 14. The controller 14 detects the paging signal and the message signal by performing synchronization, and error correction. Further the controller 14 sets a operational timing for a whole control system and controls a power supply for a radio system. In addition, the controller 14 compares a received paging number with its own paging number which is preliminarily written in an ID code memory 15 which comprises an electrically erasable programmable read only memory (EEPROM). When these two paging numbers are coincident, the controller 14 detects that the call is made against itself. In this case, the controller 14 enables a driver 16 to drive a loud speaker 17 to thereby notify a bearer of receiving the call number and, simultaneously, displays the message information associated therewith on a liquid crystal display (LCD) 18. Further, in order to make it possible for the bearer to read the message information thereafter, the message information is stored in a message memory of the controller 14. A switch 19 generates a trigger signal to stop a function for reporting the call to the bearer and to read the message informations stored in the message memory. The paging receiver can change an operation of a calling means against the bearer, for example, temporary stoppage of operational ways of a calling and change of sound volume of the loud speaker 17, by a predetermined manual operation of the switch 19 by the bearer.

The construction and operation of such paging receiver are well known as disclosed in, for example, Instruction Manual of R4A4-7B Copy Right, NEC, 1998.

Figure 2:
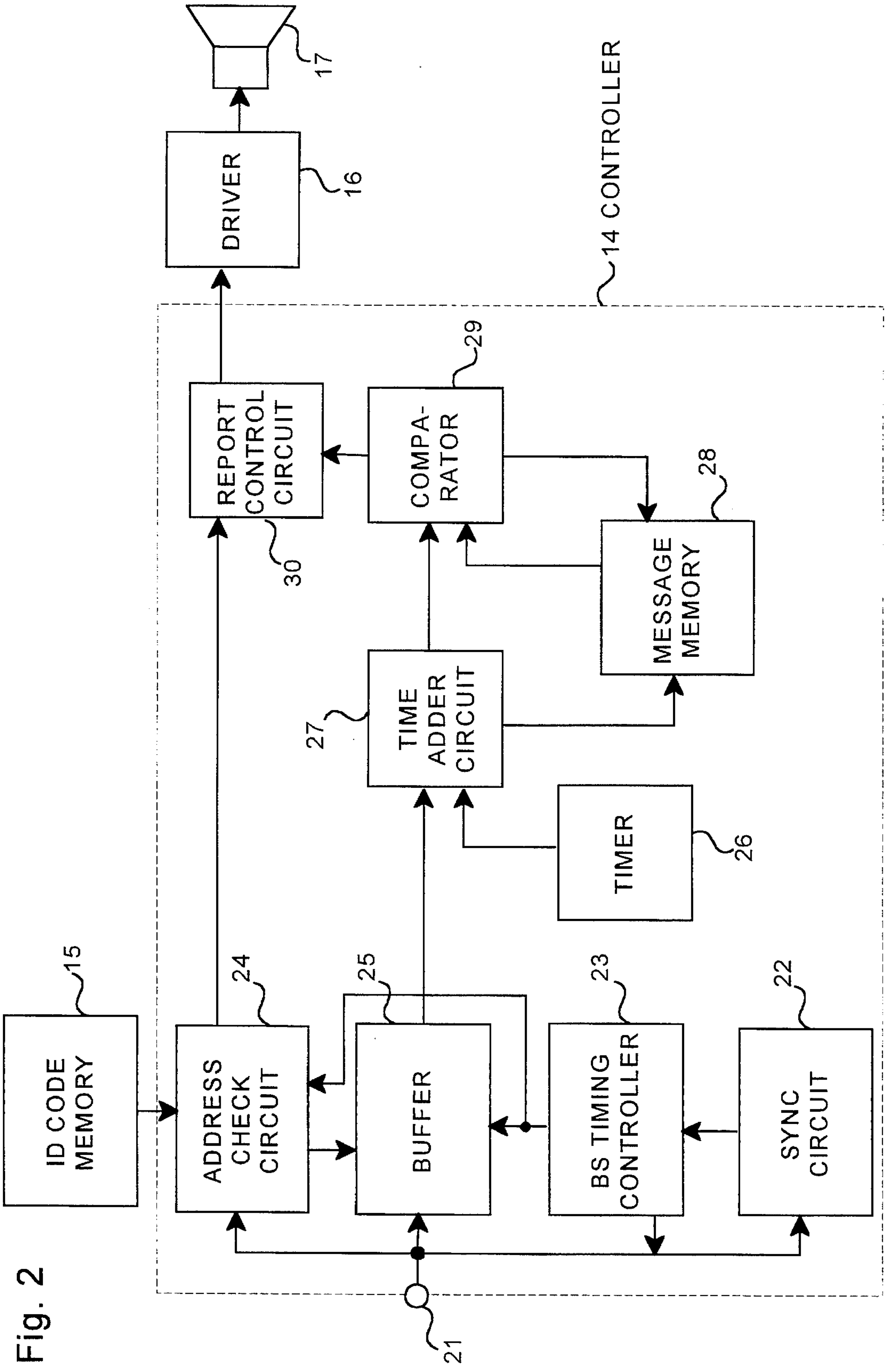
FIG. 2 is a block diagram showing a first embodiment of the present invention.

FIG. 2 is a block diagram for explaining the controller of the paging receiver. In FIG. 2, the digital signal composed of a data train containing a paging signal and a message information signal associated therewith, which is demodulated and waveform-shaped by the demodulator 13, is supplied to an input terminal 21 10 of the controller 14. A synchronization signal of the thus input digital signal is derived by a synchronization circuit 22 which synchronizes it in bit and word. In response to a sync signal, a battery saving (BS) timing controller 23 controls a operational timing of the whole control system and a power supply for the radio system. In response to a operational timing signal from the BS timing controller 23, an address check circuit 24 compares the paging number contained in the digital signal with paging numbers stored in the ID code memory 15. If these call numbers are coincident, the address check circuit 24 recognizes the paging number as the call number of the paging receiver, activates a report control circuit 210 and drives the driver 16 according to a reporting format preliminarily set by the bearer. The address check circuit 24 further stores the digitized message signal in a message buffer 25.

Since such BS timing controller 23 and sync circuit 22 are disclosed in U.S. Pat. No. 4,839,639, details thereof are omitted.

A construction and operation of a timer 26, a time adder circuit 27, a message memory 28 and a comparator 29 which form the control system of the present invention will be described with reference to FIG. 2.

The timer 26 generates a current time by counting clock pulses and sends the current time to the time adder circuit 27 as a current time signal. The time adder circuit 27 stamps the message signal with the current time signal from the timer 26 to provide a message signal stamped with current time. The message signal stamped with current time is a digital signal having 4 bits per character of message information. The message memory 28 stores already received and time stamped message signals. The message memory 28 is composed of a S-RAM.

Figure 3:
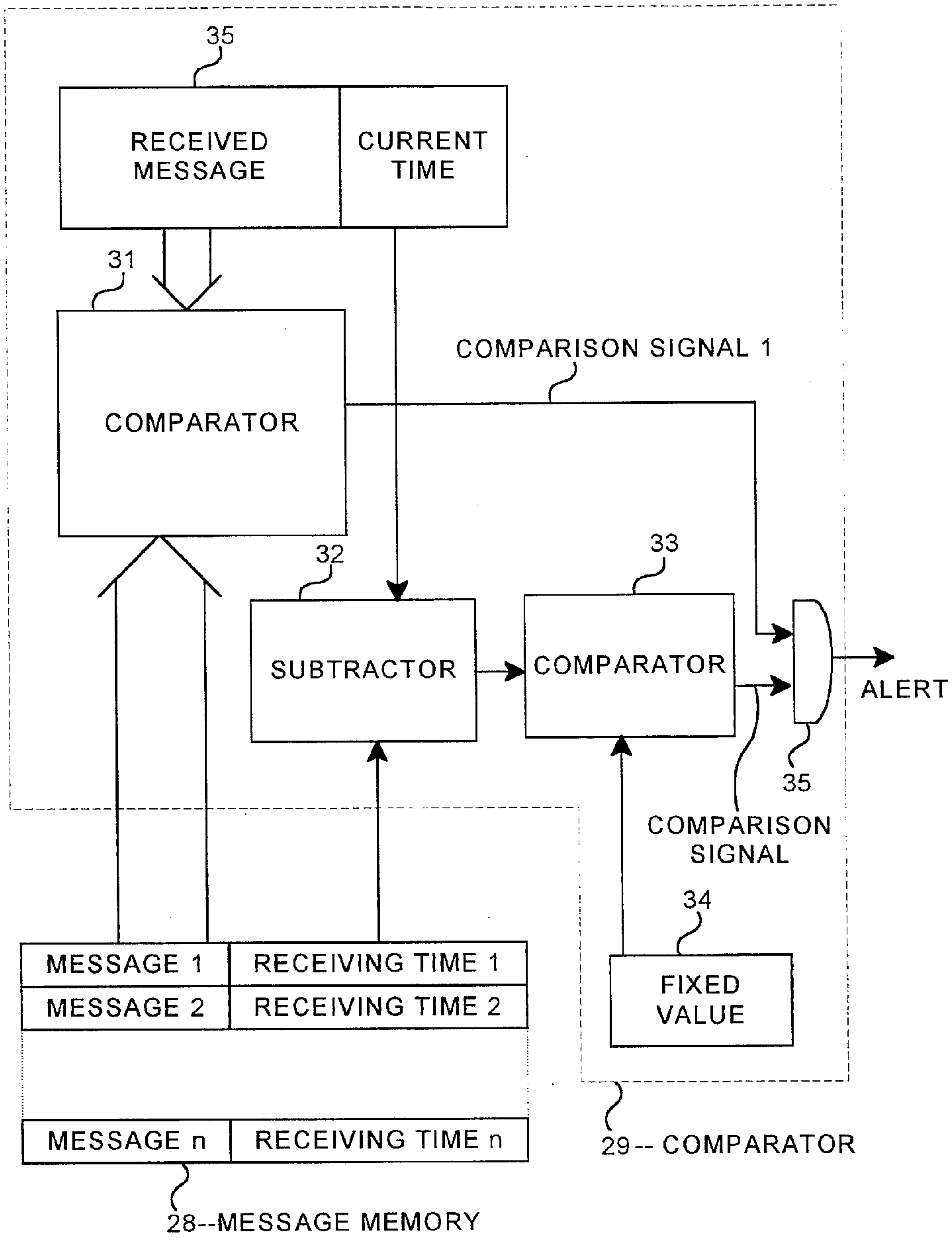
FIG. 3 is a block diagram showing in detail a comparator of the first embodiment shown in FIG. 2.

A construction of the comparator 29 will be described with reference to a block diagram shown in FIG. 3. The comparator 29 compares a received message signal 35A stamped with current time with message signals 1~n stamped with receiving times and stored in the message memory 28. The comparison is performed on both content of the message signal and time attached thereto. When the message signals are coincident and a difference between the receiving times is within a predetermined time, it is decided that the message signal stamped with current time is coincident with the message stamped with received time, and a coincidence signal is sent to the report controller 210. The coincidence signal is similar to the trigger signal from the switch 19 shown in FIG. 1 and functions in a similar manner to the control of the report controller 210 by the switch 19.

The comparison between the message signal stamped with current time and the message signals stamped with received time which have been stored in the message memory 28, which is performed by the comparator 29, includes message signal comparison and current time and receiving time comparison. First, the messages are compared by a comparator 31 of the comparator 29 and the comparator 31 sends a comparison signal to an AND gate 35. The first time comparison between current time and stored receiving time is performed by a subtracter 32 and the subtracter sends a time difference signal to a comparator 33.

The comparator 33 sends a coincidence signal to an AND gate 35 when the time difference signal is smaller than a predetermined value supplied from a fixed value circuit 34. The AND gate produces an alert signal when the contents of the message signal and time of the current time signal coincides with those of the received message signal stored in the memory.

An operation of the circuit shown in FIG. 2 will be described. A receiving buffer 25 outputs the message signal to the time adder circuit 27 on the basis of the timing control of the BS timing controller 23. Simultaneously therewith, the timer 26 sends the current time signal to the time adder circuit 27. Timings of all of subsequent operations are controlled by the BS timing controller 23. The time adder circuit 27 attaches the message signal to the current time signal input thereto and sends the message signal stamped with the current time to the comparator 29. The comparator 29 reads out the message signals stamped with received time stored in the message memory 28 one by one and compares it with the message signal stamped with the current time. If there is a coincidence between one of the message signals with received times read out from the message memory 28 and the message signal stamped with the current time, a subsequent reading of message stamped with received time from the message memory 28 is stopped. The message read out from the message memory which is coincident with the message stamped with current time is deemed as an emergency message and a coincidence signal is sent to the report controller 210. In response to this coincidence signal, the report controller 210 controls the system such that the emergency report can be noted by the bearer by, for example, maximizing volume of the sound from the loud speaker 17 through the driver 16. It is, of course, possible to use other means for notifying the emergency report to the bearer than the sound volume control. When these is a message signal stamped with the received time which was read out from the message memory 28 and whose content is coincident with that of the message stamped with the current time, the comparator 29 controls the system such that the message signal stamped with the current time is overwritten on the coincident message signal stamped with received time in the message memory 28. When there is no coincident signal, the comparator 29 newly stores the message signal with the current time in the message memory 28.

Although the controller 14 of the present inventive paging receiver is represented in a hardwired logic circuitry including the address check circuit 24, the buffer 25,, the BS timing controller 23 and the synchronization circuit 22, it can be realized that this function can be accomplished by software. In the latter case, the controller 14 may be realized by using a microprocessor μPD75308 available from NEC Corporation.

Figure 4:
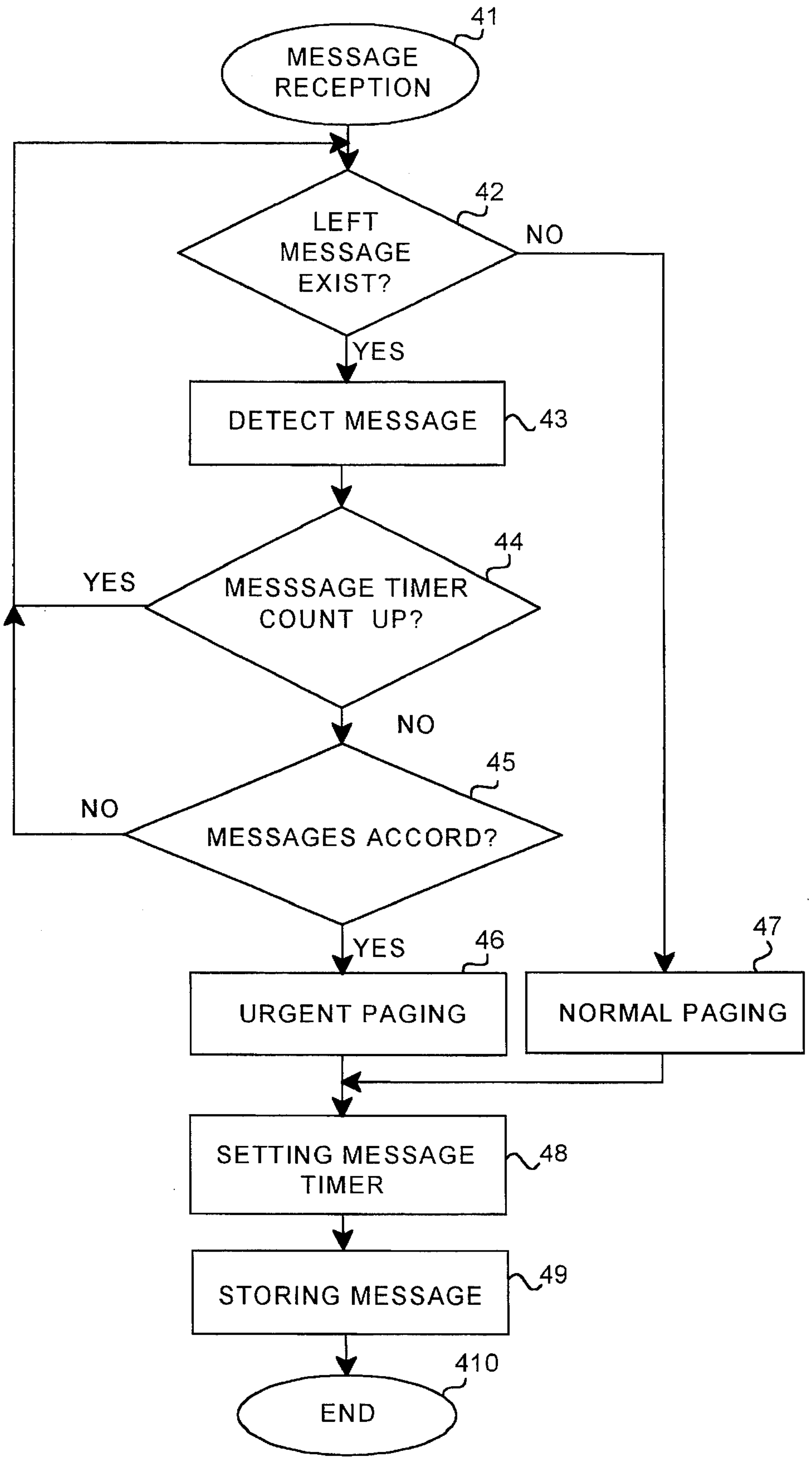
FIG. 4 is a flowchart showing an operational sequence of a second embodiment of the present invention.

FIG. 4 is a flowchart showing a sequence operation of a paging receiver according to a second embodiment of the present invention and describing a sequence operation of a message signal stamped with current time when it is coincident with a message in the message memory as a result of address check. When the message stamped with current time is input to a microprocessor in the step 41, a comparison between messages stamped with time which were previously received by the paging receiver and stored in a message memory thereof and a message stamped with current time is performed in the steps 42 to 45. "Left message" in the step 42 means any message stamped with received time which is stored in the message memory and is not searched and compared as yet. That is, a decision is made in the step 42 as to whether or not comparison of all time-stamped message signals with the message signal stamped with current time is completed. When all message signals stamped with received time which are stored in the message memory are searched and compared with the message stamped with current time and there is no left message, the message stamped with current time is processed as a normal message in the step 47. When the search is not completed, the message memory is searched in the step 44 to check whether or not the message timer counts up. The message timer means a timer which is set to a certain count value indicative of the predetermined time period during the message signal processing and can manage a time from a signal reception by down-counting the count value in real time. When the message timer counts up, a next message signal is searched and compared without checking the current message signal. If the message timer does not count up, the message signal in the message memory is checked in the step 45 and, when it is inconsistent with the message stamped with current time, a further message signal in the message memory is searched and compared. When the message timer does not count up in the step 44 and the message signal stamped with current time is coincident with a message signal in the message memory in the step 45, the message signal stamped with current time is processed in the step 46 as an emergency message. For the received message signal for which it was determined as an emergency report or a normal report as mentioned above, the message timer is newly set to the count value in the step 48 and the received message signal is stored in the message memory in the step 49. In the step 410, the microprocessor completes the series of processings after the reception of the message signal stamped with current time.

Figure 5:
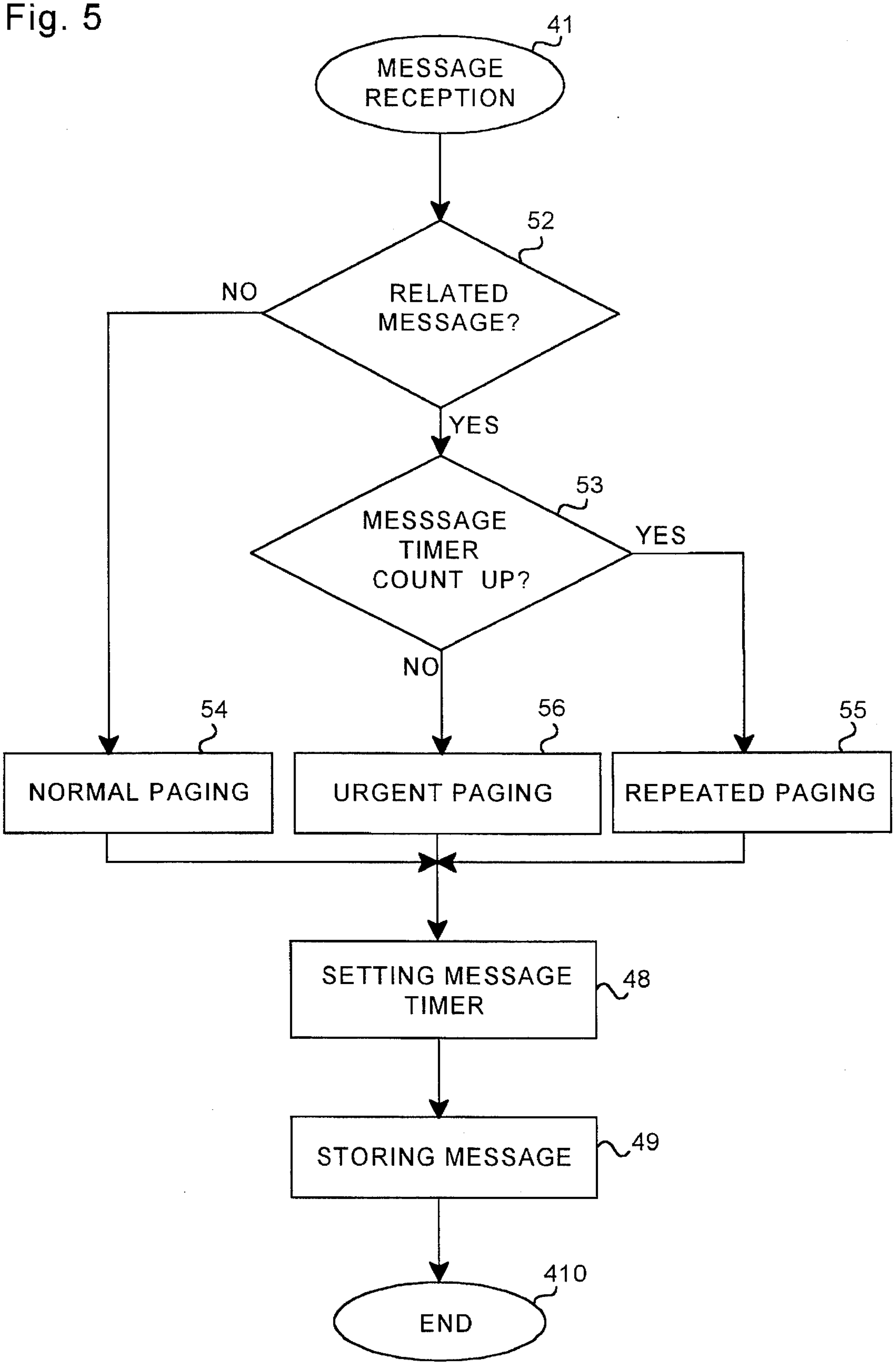
FIG. 5 is a flowchart showing an operational sequence of a third embodiment of the present invention.

FIG. 5 is a flowchart showing a sequence operation of a paging receiver according to a third embodiment of the present invention and describing a sequence operation of a controller thereof after a message signal stamped with current time is input to a microprocessor as in FIG. 4. When a message signal stamped with current time is input to a microprocessor in the step 41, it is determined in the step 52 whether or not the input message signal is one called repeatedly, that is, whether or not it is identical to a message stored in the message memory. If no, the input message is processed as a normal message in the step 54. If yes, it is determined whether or not the message timer counts up in the step 53, as in the second embodiment shown in FIG. 4. If the message timer counts up, the input message signal is processed normally in the step 55 as a repeated message. The processing of the repeated message may include attachment of a symbol to the message which is indicative of that an identical message was received twice. Further, in order to use a message area of the message memory efficiently, a message signal stamped with current time signal is overwritten in the message memory. When the input message is determined as a repeated message in the step 52 and it is decided in the step 53 that the message timer does not count up, the message is processed in the step 56 as an emergency message. The subsequent steps 48, 49 and 410 are the same as those in the second embodiment shown in FIG. 4.

Figure 6:
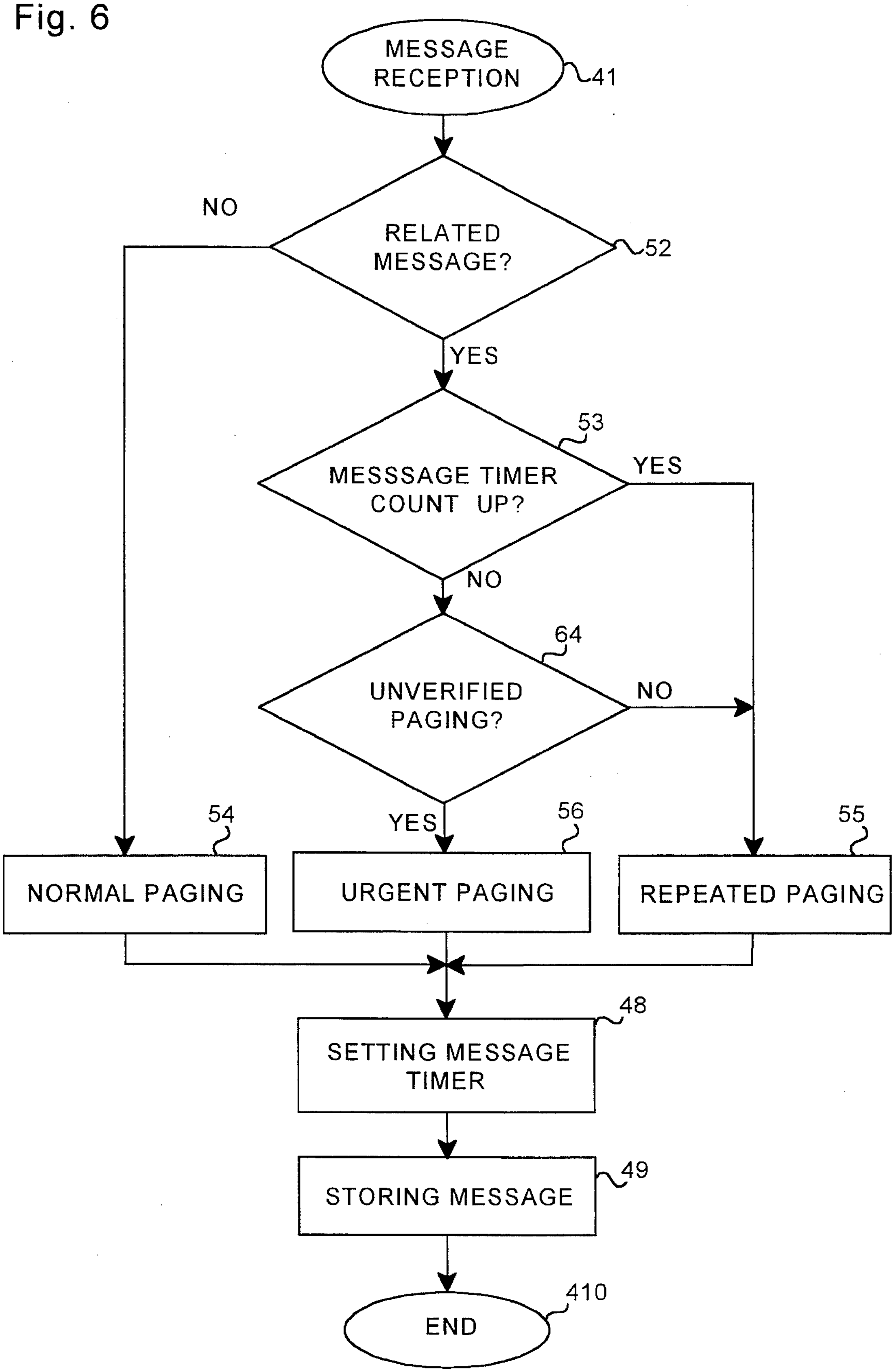
FIG. 6 is a flowchart showing an operational sequence of a fourth embodiment of the present invention.

FIG. 6 is a flowchart showing a sequence operation of a paging receiver according to a fourth embodiment of the present invention. Since the fourth embodiment is very similar to the third embodiment shown in FIG. 5, only a difference thereof from the third embodiment will be described. Conditions for emergency or urgent paging processing include a condition that a message signal is determined as being related to an unverified paging in the step 64, in addition to the condition that a message is a repeated message (step 52) and the condition that the message timer does not count up (step 53). The unverified paging includes a paging which is not reported to the bearer for a reason that, although a radio signal is received by the paging receiver, the receiver is processing another signal and a paging which, although the microprocessor performed a paging processing, the bearer did not reset the paging mode of the receiver which is in a auto-reset mode.

As described hereinbefore, the paging control system of the present invention can be applied to not only the paging receiver but also, for example, a telephone system. In the latter case, it is possible to have a communication between a sender who desires to have an emergency communication with a receiver who is under communication with another, when the sender dials the receiver repeatedly. The paging receiver of the present invention is a preferable example of application of the paging control system of the present invention.

As described, the paging receiver according to the present invention does not require a second call number when an urgent or emergency message should be sent to a bearer. Therefore, it is unnecessary for a sender to have a normal call number and an urgent call number and selectively use them. That is, when a sender has an emergency call to a bearer, it is enough to dial the normal call number of the bearer twice. Further, since the paging receiver does process not all of repeatedly received message information but only a message which is repeatedly received within a predetermined time as an emergency information message, it is possible to urgently report a real emergency call, disregarding an emergency call whose degree of emergency is low.

What is claimed is:

1. A paging receiver comprising:

decoder means for decoding a paging number and message information subsequent to said paging number from an input signal received;

check means for comparing said paging number received with a paging number of said paging receiver and producing a first coincidence signal when both paging numbers coincide with each other;

timer means for determining a current time;

time stamping means responsive to said first coincidence signal for stamping the message information with the current time determined by said timer means, and for producing message information stamped with current time;

memory means for storing message information stamped with current time as message information stamped with received time;

comparing means for comparing said message information stamped with current time, with the message information stamped with received time stored in said memory means and generating a second coincidence signal when said message information being coincident and the current time and the received time being within a predetermined time period; and emergency report means responsive to said second coincidence signal for performing an emergency report.

2. A paging receiver claimed in claim 1, wherein said timer means times with using clock pulses.

3. A paging receiver claimed in claim 1, wherein said time stamping means comprises an adder.

4. A paging receiver claimed in claim 1, wherein said memory means comprises an S-RAM.

5. A paging receiver claimed in claim 1, wherein said comparing means includes a first comparator for comparing said current time time stored in said memory means, and generating a first comparison signal, a second comparator for taking a difference between said first comparison signal and the predetermined time period, a third comparator for comparing a content of said message information stamped with current time with a content of said message information stored with received time in said memory means.

6. A paging receiver claimed in claim 5, wherein, when said comparing means generates said second coincidence signal, said message information stamped with received time stored in said memory means and compared is overwritten with said message information stamped with current time.

7. A received signal control circuit comprising:

timer means for determining a current time;

stamping means for stamping a received signal with a time determined by said timer means and producing a received signal stamped with current time;

memory means for storing a received signal stamped with current time as a received signal stamped with received time; and comparing means for comparing said received signal stamped with current time with the received signal stamped with received time stored in said memory means, and producing a coincidence signal when a difference in time between said received signal stamped with current time and said received signal stamped with received time is within a predetermined time period and contents of these signals are coincident.

8. A received signal control circuit claimed in claim 7, wherein said comparing means includes a subtractor for differentiating said current time from said time stored in said memory means to produce a time difference, a first comparator for comparing said time difference with the predetermined time period, a second comparator for comparing a content of said received signal stamped with current time with a content of said received signal stored in said memory means and stamped with received time, and means for performing an urgent report when said time difference is within said predetermined time period and contents of these signals are coincident.

* * * * *